United States Patent [19]

Ladin

[11] Patent Number: 4,620,625
[45] Date of Patent: Nov. 4, 1986

[54] FLUID ACTUATED CLUTCH ASSEMBLY

[75] Inventor: Eli M. Ladin, Ann Arbor, Mich.

[73] Assignee: Federal-Mogul Corporation, Southfield, Mich.

[21] Appl. No.: 370,710

[22] Filed: Apr. 22, 1982

[51] Int. Cl.$^4$ .................... F16D 23/14; F16D 25/08
[52] U.S. Cl. ............................ 192/85 CA; 91/468; 92/108; 92/109; 192/91 A; 192/98
[58] Field of Search ............ 192/85 CA, 88 A, 89 B, 192/91 A, 98, 110 B; 91/468; 92/107, 108, 109, 165 R, 167; 308/184 A, 184 R, 216, 233

[56] References Cited

U.S. PATENT DOCUMENTS

| | | |
|---|---|---|
| 556,704 | 3/1896 | Stevens . |
| 1,130,615 | 3/1915 | Laursen . |
| 1,464,653 | 8/1923 | Hallauer . |
| 1,613,066 | 1/1927 | Turner . |
| 1,746,765 | 2/1930 | Carhart . |
| 1,758,597 | 5/1930 | Ford . |
| 1,889,857 | 12/1932 | Gardner . |
| 1,981,262 | 11/1934 | Burt . |
| 1,994,244 | 3/1935 | Folberth et al. . |
| 1,999,366 | 4/1935 | Maybach . |
| 2,029,367 | 2/1936 | Geyer . |
| 2,057,744 | 10/1936 | Sanford . |
| 2,060,692 | 11/1936 | Rockwell . |
| 2,067,499 | 1/1937 | Millmine . |
| 2,068,579 | 1/1937 | Tatter . |
| 2,081,040 | 5/1937 | King . |
| 2,089,472 | 8/1937 | Geyer . |
| 2,135,617 | 11/1938 | Geyer . |
| 2,141,678 | 12/1938 | Andres . |
| 2,155,207 | 4/1939 | Stocker . |
| 2,211,191 | 8/1940 | Wolfram ...................... 192/91 |
| 2,268,733 | 1/1942 | Williams . |
| 2,352,812 | 7/1944 | Taylor, Jr. . |
| 2,362,242 | 11/1944 | Casler . |
| 2,387,182 | 10/1945 | Procter . |
| 2,400,585 | 5/1946 | Wolff . |
| 2,422,155 | 6/1947 | Wemp ...................... 192/85 CA |
| 2,501,005 | 3/1950 | Rockwell ...................... 192/91 |
| 2,502,798 | 4/1950 | Nabstedt et al. . |
| 2,525,220 | 10/1950 | Hague . |
| 2,541,452 | 2/1951 | Wemp ...................... 192/85 CA |

(List continued on next page.)

FOREIGN PATENT DOCUMENTS

| | | |
|---|---|---|
| 1480262 | 3/1969 | Fed. Rep. of Germany ... 192/91 A |
| 765330 | 6/1934 | France . |
| 1027925 | 4/1966 | United Kingdom . |
| 1373479 | 11/1974 | United Kingdom . |
| 2006377A | 5/1979 | United Kingdom . |
| 2088010A | 6/1982 | United Kingdom . |
| 2112490A | 7/1983 | United Kingdom . |
| 2121504A | 12/1983 | United Kingdom . |

OTHER PUBLICATIONS

Drawing of Fluid Clutch Unit for SAAB Vehicle.
Drawing of Booster Type Clutch Actuating Unit.

Primary Examiner—Rodney H. Bonck
Attorney, Agent, or Firm—Robert F. Hess; Lawrence J. Shurupoff

[57] ABSTRACT

A system for actuating a clutch by axial movement of an actuating member which is rotatable about a clutch axis with the axial movement for actuating occurring via engagement of the actuating member with a clutch release bearing, the system including a fluid actuated clutch release bearing assembly actuable along a central axis which is generally in line with the clutch axis, and with the clutch release bearing assembly including alignment means separate from the clutch release bearing for moving the axis of rotation of the clutch release bearing substantially into alignment with the clutch axis and with the clutch release bearing assembly including a housing member having an annular, axially extending cylinder portion having a cylinder cavity adapted to receive a piston for reciprocation therein, the cylinder portion being integral with the remainder of the cylinder housing whereby the need for a seal between the cylinder portion and the connecting portions of the cylinder housing is obviated and with the system including a seal located in the cylinder cavity and operative with the piston to hold the inner end of the piston in a radially spaced relationship with the confronting walls of the cylinder cavity.

41 Claims, 14 Drawing Figures

U.S. PATENT DOCUMENTS

| | | | |
|---|---|---|---|
| 2,543,252 | 2/1951 | Nabstedt et al. | |
| 2,575,765 | 11/1951 | Nabstedt et al. | |
| 2,584,926 | 2/1952 | Roll. | |
| 2,593,192 | 4/1952 | Rockwell | 160/54.5 |
| 2,612,420 | 9/1952 | Reynolds. | |
| 2,668,610 | 2/1954 | Backus | 192/91 |
| 2,717,680 | 9/1955 | Smith | 192/91 |
| 2,727,471 | 12/1955 | Martin. | |
| 2,757,769 | 8/1956 | Roise | 192/91 |
| 2,777,741 | 1/1957 | ViElmo. | |
| 2,814,540 | 11/1957 | Southerwick. | |
| 2,864,480 | 12/1958 | Sink | 192/91 |
| 2,865,481 | 12/1958 | Giri de Teramala. | |
| 2,873,834 | 2/1959 | Kepner. | |
| 2,885,049 | 5/1959 | Staadt | 192/91 |
| 2,893,519 | 7/1959 | Martin. | |
| 2,895,773 | 7/1959 | McConnaughey. | |
| 2,901,066 | 8/1959 | Garmager. | |
| 2,909,398 | 10/1959 | Taylor. | |
| 2,916,936 | 12/1959 | Neracher et al. | |
| 2,967,396 | 1/1961 | Staadt. | |
| 2,973,231 | 2/1961 | Reynolds. | |
| 3,004,438 | 10/1961 | Funk et al. | |
| 3,016,121 | 1/1962 | Mosbacher. | |
| 3,083,588 | 4/1963 | Christenson. | |
| 3,131,796 | 5/1964 | Youngs, III. | |
| 3,145,816 | 8/1964 | De Lorean et al. | |
| 3,166,165 | 1/1965 | Anderson et al. | |
| 3,203,187 | 8/1965 | Randol. | |
| 3,321,055 | 5/1967 | Randol. | |
| 3,333,665 | 8/1967 | Einchcomb et al. | |
| 3,399,647 | 9/1968 | Alexander, Jr. et al. | |
| 3,433,340 | 3/1969 | Murakami. | |
| 3,461,993 | 8/1969 | Brundage. | |
| 3,468,405 | 9/1969 | Gardner et al. | |
| 3,531,132 | 9/1970 | Lissau. | |
| 3,548,989 | 12/1970 | Root. | |
| 3,687,253 | 8/1972 | Bjorklund. | |
| 3,786,903 | 1/1974 | Haga et al. | |
| 3,832,141 | 8/1974 | Haldopoulos. | |
| 3,848,518 | 11/1974 | Martin. | |
| 3,874,382 | 4/1975 | Nogier et al. | |
| 3,892,302 | 7/1975 | Rist. | |
| 3,893,549 | 7/1975 | Bennett. | |
| 3,907,085 | 9/1975 | Rist. | |
| 3,910,131 | 10/1975 | Richards. | |
| 3,912,058 | 10/1975 | Parkins. | |
| 3,955,660 | 5/1976 | Poon et al. | 192/91 A |
| 3,965,699 | 6/1976 | Bracken, Jr. | 308/184 R |
| 3,969,950 | 7/1976 | Rau et al. | |
| 3,970,321 | 7/1976 | Dechavanne. | |
| 3,974,901 | 8/1976 | Cervinka et al. | |
| 3,975,986 | 8/1976 | Barth et al. | 91/402 |
| 4,044,871 | 8/1977 | Kiener. | |
| 4,051,937 | 10/1977 | Garrett et al. | |
| 4,067,425 | 1/1978 | Soter. | |
| 4,069,904 | 1/1978 | Garrett et al. | |
| 4,083,443 | 4/1978 | Hamada et al. | |
| 4,089,533 | 5/1978 | Knudson. | |
| 4,114,743 | 9/1978 | Sink et al. | |
| 4,243,130 | 1/1981 | Vinel et al. | 192/98 |
| 4,258,614 | 3/1981 | Aono | 92/85 R |
| 4,351,427 | 9/1982 | Miyahara | 192/98 |
| 4,352,419 | 10/1982 | Olschewski et al. | 192/98 |

FLUID ACTUATED CLUTCH ASSEMBLY

SUMMARY BACKGROUND OF THE INVENTION

The present invention relates to mechanisms for actuating clutch release bearings and more particularly relates to a fluid actuated clutch release bearing assembly including a fluid actuating device which is substantially coaxial with the axis of the associated clutch release bearing.

It has been conventional to actuate clutch release bearings solely through mechanical linkages and in certain systems a hydraulic cylinder has been used with certain of such mechanical linkages. With the latter construction, however, the basic problems attendant with the conventional linkages are not eliminated. At least some of the latter problems result from off-center loads applied to the bearing during actuation. The linkage problems have been eliminated by systems utilizing an actuator cylinder which is generally coaxial with the axis of the associated clutch release bearing and hence coaxial with the axis of the associated clutch.

In the apparatus of the present invention the release bearing is supported in such a way by its associated apparatus that it has a self-aligning feature, i.e. the axis of the bearing can automatically be brought into alignment with the clutch axis. This provides self-alignment while permitting the use of a less expensive bearing of a more conventional, non-self-aligning construction.

In addition the apparatus of the present invention is of such a design whereby certain components can be made by manufacturing techniques which can result in an overall construction which is lighter in weight and is less costly.

Therefore, it is a general object of the present invention to provide an improved fluid actuated clutch release bearing assembly which includes a fluid actuating device which is substantially coaxial with the axis of the associated clutch release bearing.

It is another object of the present invention to provide a clutch release bearing assembly of the above noted type having self-aligning features permitting the use of a non-self-aligning bearing.

It is another object of the present invention to provide a clutch release bearing assembly of the above noted type which is of a design permitting manufacture by techniques which can result in a less costly construction.

Other objects, features, and advantages of the present invention will become apparent from the subsequent description and the appended claims, taken in conjunction with the accompanying drawings, in which:

Figures 1, 1A:
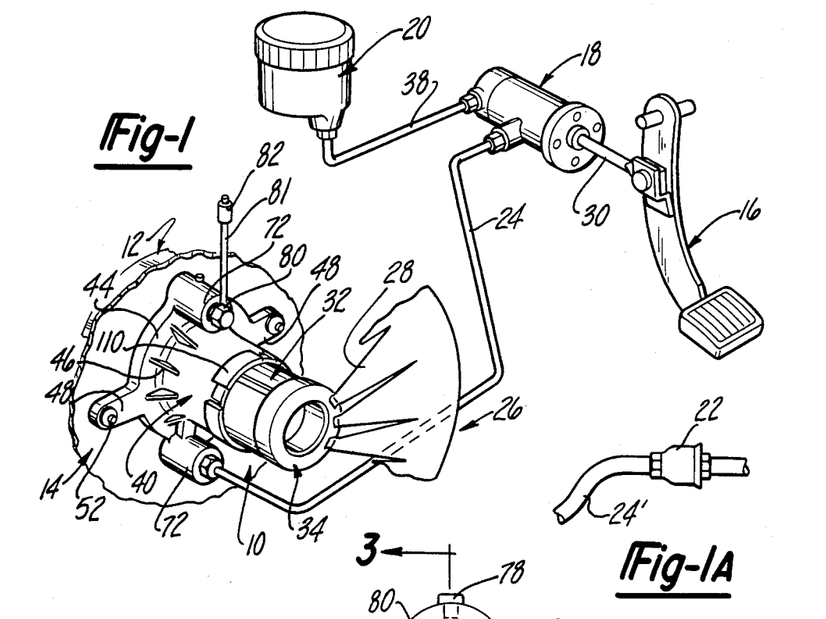
FIG. 1 is a pictorial view with some parts broken away showing a clutch system including the fluid actuated clutch release bearing assembly of the present invention.
FIG. 1A is a fragmentary view of a portion of the clutch system of FIG. 1 with the addition of a double acting check valve to assist in maintaining residual pressure.

Looking now to FIG. 1 a fluid actuated clutch release bearing assembly 10 is shown assembled to a transmission casing 12 via an associated bell housing (or clutch cover) 14. The clutch release assembly 10 is a part of clutch release system which includes a clutch pedal 16 and a master cylinder 18 in a fluid line 24. The release assembly 10 is operable to actuate a clutch 26 via engagement with clutch release fingers 28. The clutch release fingers 28 have a spring characteristic similar to that of a Belleville washer. Since clutch 26 is of a conventional structure only a portion has been shown for simplicity.

In operation, the pedal 16 is depressed actuating the master cylinder 18 via a connecting rod assembly 30. Fluid under pressure is transmitted to the clutch release assembly 10 via the fluid line 24. A piston 32 of the release assembly 10 responds to the fluid pressure and is moved outwardly and actuates the clutch 26 via engagement of a clutch release bearing 34 with the clutch release fingers 28. When the pedal 16 is released, the spring load of fingers 28 will urge the piston 32 towards its original position whereby the fluid will be returned to the master cylinder 18 through line 24; this in turn will cause pedal 16 to be returned. In this deactuated condition, the release bearing 34 may be in light engagement with the release fingers 28.

In some cases it may be desirable to assure that the release bearing 34 is in constant engagement with the actuating fingers 28 under a preselected load. This can be accomplished with the use of a double acting check valve. Such an arrangement is shown in the fragmentary view of FIG. 1A where components similar to like components in FIG. 1 are given the same numerical designation with the addition of a prime. Thus in FIG. 1A a double acting check valve 22 is located in fluid line 24' or alternatively in the associated master cylinder (element 18 in FIG. 1, not shown in FIG. 1A). Thus, check valve 22 can open relatively freely when the master cylinder (18) is actuated to transmit fluid to release assembly (10) but is set to close at a higher but still relatively low pressure when fluid is returned to the master cylinder (18) upon deactuation of the clutch. This will result in the maintenance of a residual pressure at the release assembly (10) after the clutch pedal 16 has been released. Thus the piston (32) will maintain the release bearing (34) in light engagement with the clutch actuating fingers (28).

A fluid reservoir 20 operates in a conventional manner to provide a supply of fluid to master cylinder 18 via fluid line 38. The master cylinder 18 and reservoir 20 can be of a construction similar to those well known for hydraulic brake applications and hence the details thereof have been omitted for simplicity.

Figure 2:
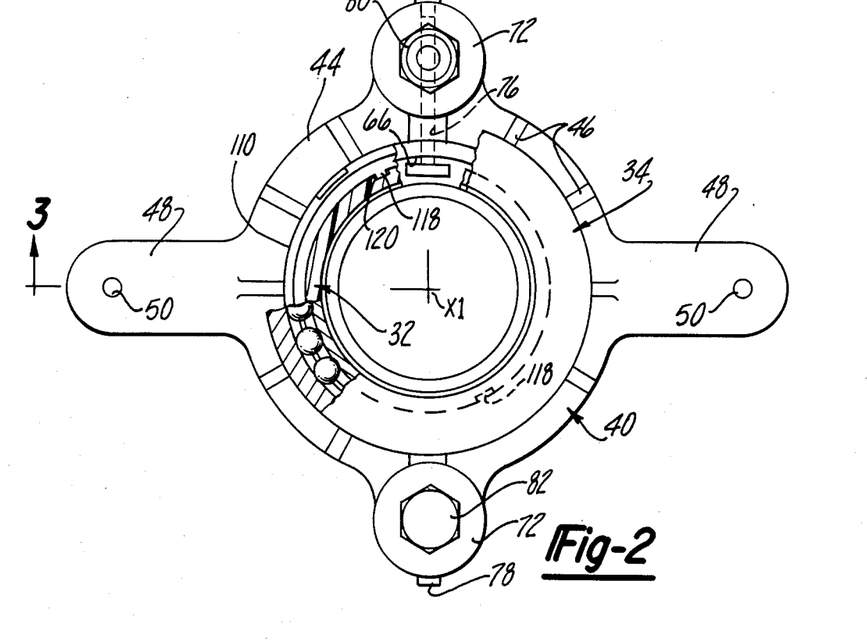
FIG. 2 is a front elevational view (to enlarged scale) of the clutch release bearing assembly of FIG. 1 with some parts broken away and others shown in section.
Figure 3:
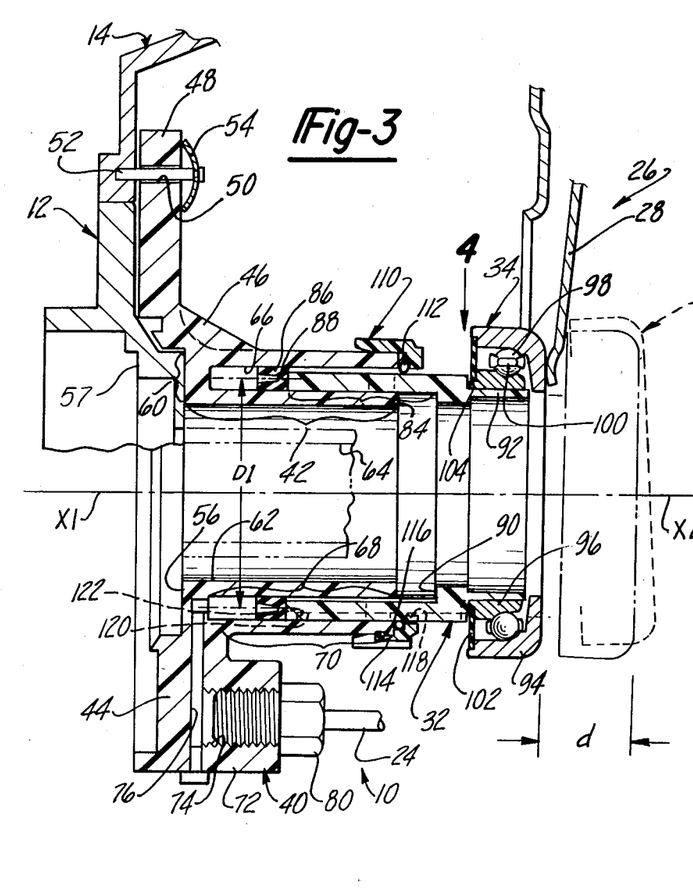
FIG. 3 is a sectional view (with some parts broken away) of the release assembly of FIG. 1 taken generally along the lines 3—3 of FIG. 2 and showing the release assembly in engagement with clutch actuating fingers in one position and showing different engaged positions in phantom.
Figure 4:
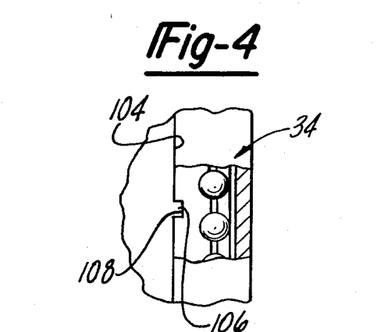
FIG. 4 is an elevational view, with some parts broken away and others in section, taken generally in the direction of the arrow 4 in FIG. 3.

Looking now to FIGS. 1-3, the clutch release assembly 10 includes a housing 40. Housing 40 has a generally tubular cylinder portion 42 connected with an enlarged mounting flange portion 44. A plurality of circumferentially spaced reinforcing ribs 46 are located in the transition between the flange portion 44 and the cylinder portion 42. The flange portion 44 has a pair of radially extending, diametrically opposed mounting arms 48 each of which includes a through opening 50. A pair of mounting pins 52 are supported in the face of the bell housing 14 and are adapted to extend through openings 50 in a radial clearance relationship. The housing 40 (and hence release assembly 10) is held to the bell housing 14 via spring clips 54 which are secured via engagement with slots in pins 52. The spring clips 54 hold the release assembly 10 in place under a light, resilient clamp force such that, within the confines of the clearance between the pins 52 and associated openings 50, the housing 40 (and hence the release assembly 10) is free to move radially. As will be seen this freedom of radial movement enhances the utility of the release assembly 10 to locate the rotational axis X1 of bearing 34 into alignment with the axis X2 of the clutch 26. To this end, the housing 40 has a stepped counterbore 56 which is of a configuration which generally follows that of an end cap 57 which is supported as a part of the transmission casing 12. Note, however, that the counterbore 56 provides a slight radial clearance with the radially confronting portions of the end cap 57 such that the desired radial movement noted above can be accommodated. It should also be noted that the axial engagement between the housing 40 and transmission casing 12 occurs between a portion of the innermost surface of counterbore 56 and a portion of the outermost surface of the cap 57; this limited annular contact area has been designated by the bracket 60. At the same time a slight axial clearance has been provided between the remainder of the flange portion 44 (including arms 48) and the confronting surface portions of the bell housing 14 and end cap 57. The limited, and controlled contact area is selected to minimize friction and resistance to radial movement whereby axial alignment between bearing 34 and clutch 26 can be more readily accomplished and to minimize structural deflection of housing 40 during actuation of assembly 10.

The housing 40 has a reduced diameter through bore 62 which communicates with counterbore 56. In conventional mechanically actuated systems, an axially extending tubular housing portion (or quill) 64 (shown in phantom) extends through the bore 62. The quill 64 (only partially shown) generally shields that portion of the transmission shaft interconnecting the transmission with the clutch. The outer surface of the quill 64 is machined to slidingly support an associated clutch release bearing. In the present invention, the quill 64 is eliminated resulting in a savings.

The cylinder portion 42 of housing 40 includes an annular cylinder cavity 66 defined by radially spaced inner and outer, annular cylinder portions 68 and 70, respectively. The portions 68 and 70 extend generally coextensively, axially outwardly.

The flange portion 44 has a pair of diametrically opposed bosses 72 located in quadrature relative to the mounting arms 48. Each boss 72 has an axially extending threaded bore 74 which communicates with a radially extending cross bore 76 which in turn communicates with cylinder cavity 66. The radially outer ends of cross bores 76 are plugged via sealing plugs 78. One of the threaded bores 74 receives a fluid fitting 80 connected to the end of fluid line 24 while the other of the bores 74 receives a bleed line 81 capped with a threadably removable plug 82. Plug 82 can be used for bleeding air from the cylinder cavity 66 and the connecting fluid passages during initial charging of the system.

Piston 32 is of a tubular construction and has an annular piston portion 84 adapted to be received within the annular cylinder cavity 66 for reciprocable movement. The piston portion 84 is provided to have a preselected radial clearance relative to cylinder cavity 66 at both its radially inner and outer surfaces. This permits a selected, limited radial movement whereby co-axial alignment of the axis X1 of bearing 34 with clutch axis X2 is additionally facilitated. In one form of the invention where the mean diameter D1 of the piston portion 84 and cylinder cavity 66 was 1.85 inches a total radial clearance of 0.062 inches was provided. By contrast, it should be noted that the sliding clearance for a conventionally constructed piston and cylinder of the same general size would be approximately 0.006 inches. With the present invention, the radial clearance to provide the desired radial movement should be greater than around 0.010 inches. At the same time excessive radial clearance would not be desirable.

As noted any misalignment between the axes can be accommodated by self-aligning bearings. The maximum misalignment that is normally accommodated in this manner is from around 0.015 inches to around 0.030 inches. The above described structure of the present invention provides such a range of self-alignment while permitting the use of a conventional bearing.

An annular seal 86, of a suitable elastomeric and/or resilient material, is located in cylinder cavity 66 and is engageable with the innermost surface 88 of piston portion 84. The area of surface 88 is maintained proximate to the confronting area of the seal 86 to inhibit extrusion of the seal 86 into any gap between the piston portion 84 and the side walls of cylinder cavity 66 caused by the desired clearance. If necessary the piston portion 84 can be radially stepped for a short axial distance such that the area at the end surface 88 is greater than the area of the piston portion after the step whereby seal extrusion will be prevented but radial movement of the piston 32 can still be accommodated.

Figure 5:
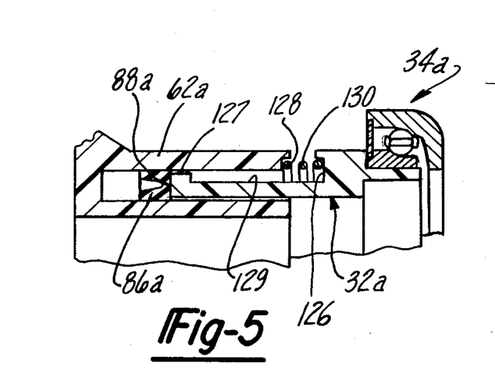
FIG. 5 is a fragmentary view showing a modified form of the release assembly of FIGS. 1-4 with the addition of a spring member biased for maintaining continuous contact of the release bearing with the clutch actuating fingers.

Such a stepped construction is shown in FIG. 5 and will be described in conjunction with that embodiment.

As can be seen in FIG. 3 the radial clearance not only permits movement radially but also permits a limited amount of angulation of the axis of piston 32. As the piston 32 moves outwardly the amount of possible angulation increases. Note that the axial movement and angulation of the piston 32 can occur because the end of piston 32 extending out from the cylinder cavity 66 is unsupported and is free to move radially to seek the proper co-axial alignment.

A radially inwardly extending stop shoulder 90 is located a preselected distance from the inner end of piston 32 to stop the inward most movement of piston 32 whereby the seal 86 will not be moved against the back wall of cylinder cavity 66 by return movement of piston 32. The outer end of piston 32 terminates in a reduced section, annular support ring 92. The ring 92 is of an outside diameter to snugly receive and support the bearing 34. The bearing 34 is a ball bearing assembly of an angular contact type and includes an outer race 94, an inner race 96, and a plurality of ball members 98 circumferentially spaced by a cage 100; an annular seal 102 is located between the outer race 94 and the inner race 96. The inside diameter of inner race 96 and the outside diameter of the support ring 92 are selected to provide a slight interference fit whereby the bearing 34 will be securely, axially held to the end of piston 32. An annular shoulder 104 is defined by the juncture of the support ring 92 and the adjacent portion of the piston 32. When assembled, the inner race 96 engages the shoulder 104 whereby axial loads on the bearing 34 are transmitted to the piston 32. It can be seen that the support ring 92 and the adjacent portion of the piston 32 are unsupported by the cylinder portion 42 over the travel of the piston 32 thus facilitating the radial movement and angulation for providing the desired co-axial alignment previously discussed. While an angular contact type bearing is shown, a suitable thrust type bearing could be used especially in view of the self-alignment feature.

In the embodiment of FIGS. 1-4, the bearing 34 is adapted for outer race rotation. It is desirable to assure that the inner race does not rotate. Thus in order to prevent relative rotation between the inner race 96 of bearing 34 and the piston 32, the inner race 96 is provided with an axially extending slot 106 adapted to receive a tab 108 located in shoulder 104 of piston 32 (see FIG. 4).

A dust cap 110 is located over the outer end of the cylinder portion 42 and holds an annular resilient dust seal 112 which is adapted to seal against the radially outer surface of piston 32 as it is reciprocated. The seal 112 (FIG. 3) is dimensioned to accommodate the radial movement of the piston 32. The cap 110 is axially held in place by a plurality of circumferentially disposed flexible fingers 114 which are locatable in a similar plurality of notches 116 in the outer surface of the cylinder portion 42. Thus this latter engagement also holds the dust cap 110 from rotation relative to the cylinder portion 42.

The dust cap 110 also has a pair of diametrically opposed, radially inwardly extending tabs 118 which are locatable within axially extending slots 120 in the outer surface of the piston 32 (see FIGS. 2 and 3). This engagement prevents relative rotation between the piston 32 and the housing 40. Thus the inner ring 96 of bearing 34 will be positively held from rotation by virtue of the engagement of inner race slot 106 with tab 108 in piston shoulder 104, the engagement of dust cap tabs 118 with piston slots 120, and the engagement of dust cap fingers 114 in cylinder portion notches 116. The seal 112 can be provided to engage the piston 32 and the cap 110 with a sufficient frictional force to essentially inhibit rotation of the piston 32 whereby the need for the above noted anti-rotational construction could be obviated.

While the axial slots 120 extend through the outer end of piston 32 they terminate in shoulders 122 at the inner end. The shoulders 122 are adapted to engage dust cap tabs 118 whereby movement of the piston 32 completely out from the cylinder cavity 66 will be precluded. It should be noted that with the piston 32 in its innermost (retracted) position, the shoulder 90 will locate the bearing 34 away from the outer axial end of dust cap 110.

Looking now to FIG. 3 the release bearing assembly 10 is shown (in solid lines) in a position where the outer race 94 is in light engagement with clutch actuating fingers 28. When the clutch pedal 16 (FIG. 1) is depressed the pressure in cylinder cavity 66 is increased moving the piston 32 axially outwardly to overcome the spring force of clutch fingers 28 whereby the clutch 26 will be actuated to its disengaged condition. If the axis of rotation of the outer race 94 is not in alignment with that of the clutch fingers 28 a force will be exerted on the outer race 94 urging it towards alignment. The structure of the present invention will permit movement towards such alignment. Thus the ability of the housing 10 to move radially and the ability of the piston 32 to move radially and to angulate each independently and together assists in permitting self-alignment of the bearing 34. Such self-alignment movement is shown in phantom in FIG. 3. Thus with such a structure a conventional bearing can be utilized in lieu of a bearing having a specific self-alignment construction. An example of such a self-alignment bearing is shown in U.S. Pat. No. 4,276,974, issued July 7, 1981, for Self-Aligning Clutch Release Bearing to Eli Ladin. It should be understood that the release bearing assembly 10 could be used with a self-aligning bearing, which would result in still greater overall self-alignment capability.

In some constructions it may be desirable (to prevent chatter for example) to mechanically assist the axial force provided hydraulically for continuous engagement between the bearing 34 and the clutch fingers 28. Such a construction is shown in FIG. 5. In the embodiment of FIG. 5 components similar to like components in the embodiment of FIGS. 1-4 are given the same numerical designation with the addition of the letter postscript "a".

Thus in FIG. 5, the piston 32a and the end cylinder portion 62a are provided with confronting annular recesses 126 and 128, respectively, which receive opposite ends of a coil spring 130. The spring 130 is preloaded to urge the piston 32a outwardly whereby the bearing 34a will be urged into engagement with the clutch fingers 28a with a preselected axial force for continuous engagement. Of course, the magnitude of the total axial force for such continuous engagement (prior to clutch actuation) would not be sufficient to actuate the clutch. In the construction of FIG. 5 the piston 32a is provided with an enlarged flange like portion 127 and a reduced diameter body portion 129. With this construction an adequate area of contact is provided by surface 88a for engagement with seal 86a whereby extrusion under pressure is inhibited. The radially outer surface of portion 127 is slightly curved. Thus the piston 32a can still angulate for self adjustment purposes.

In some applications it may be desirable to provide that the bearing be held out of engagement with the clutch fingers during non-actuation of the clutch. Such a structure is shown in FIG. 6 where components similar to like components in the embodiments of FIGS. 1-4 and 5 are given the same numerical designation with the addition of the letter postscript "b".

Figures 6, 9, 10, 11:
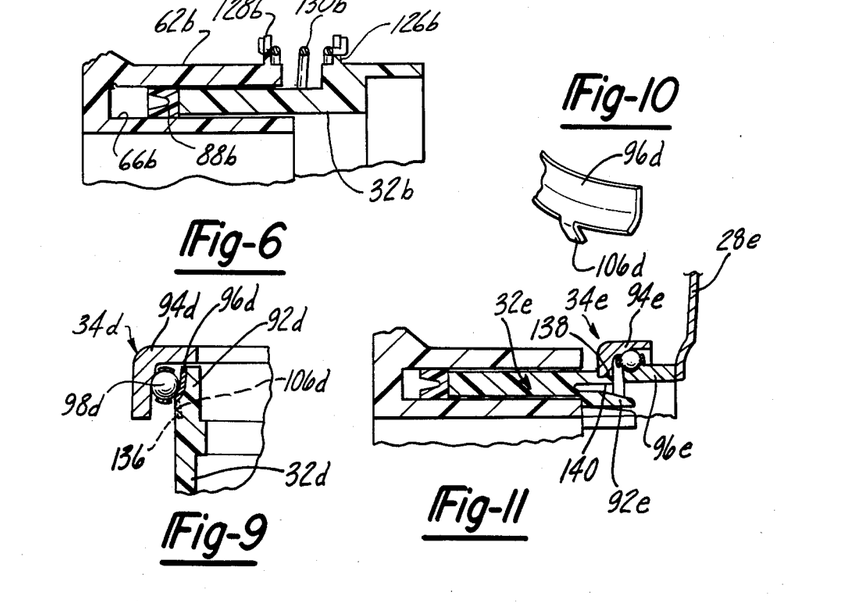
FIG. 6 is a fragmentary, sectional view showing a modified form of the release assembly of FIGS. 1-4 with the addition of a spring member biased for returning the release bearing to its deactuated position.
FIG. 9 is a fragmentary sectional view of a modified release bearing and support structure, with the bearing having a thin walled inner race, for use with the clutch release bearing assembly of FIGS. 1-4.
FIG. 10 is an enlarged fragmentary view of a portion of the inner race of FIG. 9 depicting an anti-rotation structure.
FIG. 11 is a fragmentary, sectional view depicting a modified clutch release bearing adapted to actuate the associated clutch fingers by inner race engagement.

Thus in FIG. 6, the piston 32b and end of cylinder portion 62b are provided with annular ridges 126b and 128b, respectively, which receive opposite ends of a coil spring 130b. The spring 130b is preloaded to urge the piston 32b inwardly whereby the bearing 34b will be moved out of engagement with the clutch fingers 28b when the clutch is deactuated. This preload will be operative to provide a positive pressure in cylinder cavity 66b and hence to assist in maintaining fluid pressure on the seal 88b whereby cavitation and fluid leakage can be inhibited.

Figures 7, 12:
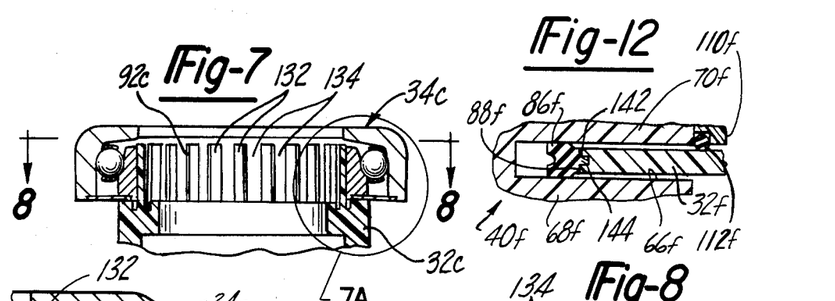
FIG. 7 is a fragmentary view with some parts shown in section of a flexible bearing support ring for providing additional alignment capability for the release bearing.
FIG. 12 is a fragmentary, sectional view of a modified piston and seal for a fluid actuated clutch release bearing assembly.
Figure 7A:
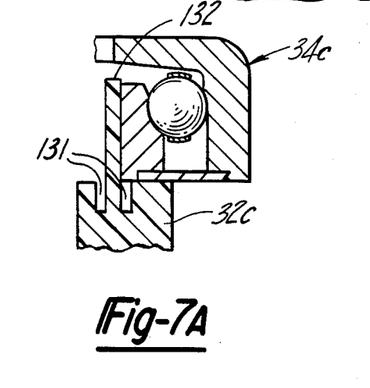
FIG. 7A is an enlarged, fragmentary sectional view of a portion of the support ring of FIG. 7 generally shown in the area designated by the numeral 7A in FIG. 7.
Figure 8:
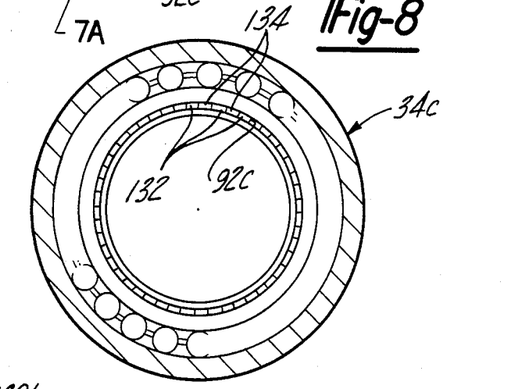
FIG. 8 is a sectional view of the apparatus of FIG. 7 taken generally along the lines 8—8 of FIG. 7.

As noted for purposes of self-alignment, it may be desirable that the bearing support ring 92 (FIGS. 1-4) be flexible. In FIGS. 7, 7A and 8 a structure is shown in which such flexibility is provided; in the embodiment of FIGS. 7, 7A and 8 components similar to like components in the embodiment of FIGS. 1-4 are given the same numerical designation with the addition of the letter postscript "c".

Thus in FIGS. 7 and 8 the piston 32c has a bearing support ring 92c with a plurality of axially extending fingers 132; the fingers 132 are separated by slots 134 whereby a flexible support for bearing 34c is provided to further enhance the alignment capability of the bearing 34c. Note that the fingers 132 are radially notched via axially extending notches 131 (see FIGS. 7 and 7A) whereby their flexibility is enhanced.

Because the loading on the release bearing is mainly axial, i.e., since the radial side loads attendant with mechanically actuated systems have been essentially eliminated, it is possible to utilize a thin walled inner race. Such a construction is shown in FIGS. 9 and 10. In FIGS. 9 and 10 components similar to like components in the embodiment of FIGS. 1-4 are given the same numerical desigation with the addition of the letter postscript "d".

Thus in FIG. 9, the piston 32d has a bearing support ring 92d which is of a greater wall thickness than that shown in the other embodiments of FIGS. 1-8. The bearing 34d while having a conventional outer race 94d is provided with a thin walled inner race 96d. In one form the thin walled race could be of a thickness of from around 0.060 inches to around 0.100 inches. With such a wall thickness, the inner race 96d could lend itself to fabrication by stamping hence providing for an inexpensive structure. By contrast the more conventionally formed inner race 96 of FIGS. 1-4 would be around 0.250 inches thick. Since the radially inner surface of the inner race 96d will conform to the arcuate shape of its radially outer surface defining the raceway for the ball member 98d, the seat provided by the engaging surface of support ring 92d is similarly contoured. Preferably the support ring 92d will receive the inner race 96d with a slight press fit. Anti-rotation is provided by tabs 106d, shown also in FIG. 10 which after installation can be bent over into retaining slots 136 in the piston 32d. Thus in the latter construction an inexpensive bearing construction is used.

In some structures it is advantageous to provide engagement with the clutch fingers by the inner race and to hold the outer race from rotation. Such a structure is shown in FIG. 11 where components similar to like components in the embodiment of FIGS. 1-4 are given the same numerical designation with the addition of the letter postscript "e".

Thus in FIG. 11, the bearing 34e has an inner race 96e adapted to engage the clutch actuating fingers 28e. The outer race 94e is supported on the support ring 92e and is fixed from rotation by axially extending ridges 138 on piston 32e engaging slots 140 in outer race 94e.

It may be desirable to support the inner end of the piston radially spaced from the confronting side walls of the associated cylinder cavity. Such a structure is shown in FIG. 12 where components similar to like components in the embodiment of FIGS. 1-4 are given the same numerical designation with the addition of the letter postscript "f".

In FIG. 12 piston 32f (partially shown) has an annular, circular groove 142 formed in its end surface 88f. The annular seal 86f has an annular ring portion 144 adapted to be matingly received within the groove 142. The ring portion 144 is generally radially centrally located between the radially inner and outer surfaces of the seal 86f. In this way the end 88f of the piston 32f will be radially held generally in the center of the cylinder cavity 66f and will be spaced from the radially confronting walls of cylinder portions 68f and 70f. Note that the connection between seal 86f and piston 32f is resilient permitting radial and pivotal movement of piston 32f. Thus while the piston 32f can move relative to housing 40f to provide the self-alignment previously discussed its inner end 88f will be held resiliently away from the cylinder walls thereby inhibiting scoring of the cylinder walls as the piston 32f is reciprocated within the cylinder cavity 66f. Scoring of the cylinder walls could result in leakage of fluid past seal 86f. Thus the construction of FIG. 12, by minimizing and/or precluding engagement of the end 88f with the cylinder walls, inhibits scoring and enhances sealing. While a ring (144) and groove (142) arrangement is shown, other constructions could be utilized to hold the end 88f of the piston 32f spaced from the cylinder walls during reciprocation whereby engagement is prevented. Cap 110f (partially shown) and seal 112f are not discussed but perform the same functions as their similarly numbered counterparts in FIGS. 1-4. It should be noted that seal 112f generally resiliently, radially supports the outer end of piston 32f while permitting radial movement thereof.

A significant advantage of the structure shown and described is its ease of fabrication. Thus the housing 40 can be of a one piece molded plastic. In a preferred form, the material of the housing 40 was made of a molded thermoplastic material such as Zytel FE-8018; the material was glass reinforced, including approximately 13% by weight of chopped fiber glass; Zytel is a trademark of E. I. duPont de Nemores & Co., (Inc.) with the noted material being essentially a nylon resin. The dust cap 110 can also be of a one piece molded structure of the same material. The piston 32 can be molded of a thermoplastic made of Zytel 103HS-L with the material being essentially a nylon resin. The piston 32 is softer than housing 40 to inhibit wear of sealing surfaces of housing 40.

By thus making one or more of the above components from plastic, significant economies can be realized. In addition, by molding the housing 40 in essentially one piece, the need for sealing between joints or providing pressure tight connections is minimized. For example, by molding the cylinder portion 42 of one piece, the need for sealing the structural connection between radially inner and outer cylinder portions 68 and 70, respectively, is eliminated, i.e., if cylinder portion 68 were made of a separate piece, an additional seal would be required and in addition, means would be required to assure concentricity between cylinder portions 68 and 70 if such a separate construction were used.

Since the plastic materials noted have good lubricity characteristics, wear is minimized. The housing 40 because of its simple design can be made from a metal die casting such as aluminum. In either event the need for machining can be minimized.

Thus the above described structures provide an assembly which lends itself to self-alignment while still utilizing a conventional non self-alignment bearing. At the same time the design is of a simple construction whereby the housing can be made of a one piece molded plastic or die casting minimizing the need for seals of fluid tight joints.

While it will be apparent that the preferred embodiments of the invention discosed are well calculated to fulfill the objects above stated, it will be appreciated that the invention is susceptible to modification, variation and change without departing from the proper scope or fair meaning of the invention.

What is claimed is:

1. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said clutch release bearing assembly further including alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, said alignment means including support means for supporting said housing member against a radially extending support surface on a support housing and generally axially retaining said housing member while permitting a preselected limited radial movement.

2. The system of claim 1 with said housing member having a radially extending annular end surface at one end of said cylinder portion and adapted to engage said support surface, said housing member having radially extending mounting arms adapted to be spaced from said support surface whereby engagement of said housing member and said support housing is substantially solely between said annular end surface and said support surface, and contact area of said end surface being preselected to minimize friction and facilitate radial movement of said housing member.

3. The system of claim 1 including pressure means adapted to maintain a residual fluid pressure in said cylinder cavity, said pressure means comprising resilient means connected to said piston for urging it into said cylinder cavity.

4. The system of claim 1 including means for supporting the inner end of said piston in spaced radial relationship from the confronting walls of said cylinder cavity.

5. The system of claim 1 with said alignment means also permitting a pivotal movement of at least a part of said clutch release bearing assembly in response to engagement of the clutch release bearing with the clutch actuating member whereby the axis of rotation of the clutch release bearing can be substantially radially and pivotally moved into alignment with the clutch axis.

6. The system of claim 5 including pressure means adapted to maintain a residual fluid pressure in said cylinder cavity, said pressure means including a two way check valve.

7. The system of claim 5 including an annular seal located within said cylinder cavity for providing a seal between that portion of said cylinder cavity in which said piston is located and the remainder of said cylinder cavity, said seal adapted to reciprocate with said piston, support means connected between said seal and said piston for supporting the inner end of said piston in radially spaced relationship from the confronting walls of said cylinder cavity.

8. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said clutch release bearing assembly further including alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, and pressure means adapted to maintain a residual fluid pressure in said cylinder cavity, said pressure means including a two way check valve.

9. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said clutch release bearing assembly further including alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, and an annular seal located within said cylinder cavity for providing a seal between that portion of said cylinder cavity in which said piston is located and the remainder of said cylinder cavity, said seal adapted to reciprocate with said piston, support means connected between said seal and said piston for supporting the inner end of said piston in spaced radial relationship from the confronting walls of said cylinder cavity.

10. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, said cylinder cavity having a circular contour generally defining an annulus, said cylinder portion having a radially outer wall portion and a radially inner wall portion radially spaced therefrom to define said cavity, said cylinder cavity having an opening at one end, a generally tubular piston adapted to be received through said opening in said cylinder cavity for reciprocation therein generally along said central axis in response to fluid pressure in said cylinder cavity, seal means located within said cylinder cavity and adapted for movement with said piston and for providing a seal of that portion of said cavity located axially inwardly of said piston, a connecting wall portion located at the opposite end of said cavity opening and connecting said radially outer and inner wall portions together, said piston adapted to engage the clutch release bearing for providing reciprocable movement with said piston, said radially inner wall portion having a radially inner sealing surface located within said cavity and adapted to be sealingly engaged by said seal means, said radially outer wall portion having a radially outer sealing surface located within said cavity and being generally in radial confrontation and axially co-extensive with said inner sealing surface and adapted to be sealingly engaged by said seal means, said piston being in radial clearance with said inner and outer wall portions with said total radial clearance being at least around 0.01 inches for a mean diameter of said cavity of around 1.8 inches, said cylinder portion including said radially outer and inner wall portions and said connecting wall portion being made of a one piece molded plastic having good lubricity whereby the need for a sealed connection between said outer and inner wall portions and said connecting wall portion is obviated.

11. The system of claim 10 with said housing member being of a one piece construction molded from a fiber glass reinforced plastic.

12. The system of claim 11 with said housing member having approximately 13% by weight of chopped fiber glass.

13. The system of claim 11 with said piston being a one piece plastic molded member which is softer than the material of the walls of said cylinder portion.

14. The system of claim 10 with said total radial clearance being around 0.06 inches where said mean diameter is around 1.8 inches.

15. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said cylinder portion being integral with the remainder of said cylinder housing whereby the need for a seal between said cylinder portion and the connecting portions of said cylinder housing is obviated, said piston being in radial clearance relationship with the confronting surfaces of said cylinder portion permitting a preselected radial and pivotal movement of said piston in response to engagement of the clutch release bearing with the clutch actuating member whereby the axis of rotation of the clutch release bearing can be substantially moved into alignment with the clutch axis, and said support ring portion being defined by a plurality of axially extending flexible fingers permitting a second preselected radial and pivotal movement of said piston in response to engagement of the clutch release bearing with the clutch actuating member whereby the axis of rotation of the clutch release bearing can be substantially moved into alignment with the clutch axis.

16. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said cylinder portion being integral with the remainder of said cylinder housing whereby the need for a seal between said cylinder portion and the connecting portions of said cylinder housing is obviated, said piston being in radial clearance relationship with the confronting surfaces of said cylinder portion permitting a preselected radial and pivotal movement of said piston in response to engagement of the clutch release bearing with the clutch actuating member whereby the axis of rotation of the clutch release bearing can be substantially moved into alignment with the clutch axis, and pressure means adapted to maintain a residual fluid pressure in said cylinder cavity, said pressure means including a two way check valve.

17. In a system for actuating a clutch by axial movement of an actuating member rotatable about a clutch axis via engagement with a clutch release bearing, the improvement comprising fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, an annular dust cap secured to the outer end of said cylinder portion and having a seal member adapted to engage said piston, anti-rotation means for preventing rotation of said piston within said cylinder cavity and relative to said housing member, said anti-rotation means comprising first means for preventing rotation between said dust cap and said cylinder portion, and second means for preventing rotation between said dust cap and said piston.

18. The system of claim 17 with said clutch release bearing having inner and outer race members and being adapted to have one of said race members supported on said support ring portion and securing means for preventing rotation of said one of said race members relative to said support ring, said second means comprising a tab on said dust cap radially extending into an axial groove in said piston.

19. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said ring portion extending outwardly from said cylinder portion whereby a portion of said piston including said ring portion is radially unsupported, said piston and hence said ring portion and the release bearing being mounted for pivotal movement relative to the clutch axis such that as said piston moves further axially outwardly from said cylinder portion the angle of pivotal movement increases whereby alignment of the central axis of the clutch release bearing assembly with the clutch axis can be attained, an annular dust cap secured to the outer end of said cylinder portion and having a seal member adapted to engage said piston, said housing member having mounting means adapted to receive fasteners for axially securing said clutch release bearing assembly to an associated housing.

20. The system of claim 14 further comprising anti-rotation means for preventing rotation of said piston within cylinder cavity and relative to said housing member, said anti-rotation means including an axial groove in one of said piston and a confronting wall connected with said cylinder portion and a radial tab located in said axial groove and extending radially from the other of said piston and said confronting wall.

21. The system of claim 19 with said clutch release bearing having inner and outer race members with said inner race member being of a thin walled, generally uniform wall thickness and hence having an outer surface having a contour similar to that of the inner, raceway surface, said support ring having a support surface generally conforming in shape to the shape of said outer surface.

22. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said ring portion extending outwardly from said cylinder portion whereby said ring portion is substantially radially unsupported, an annular dust cap secured to the outer end of said cylinder portion and having a seal member adapted to engage said piston, said housing member having a pair of radially outwardly extending mounting arms adapted to receive fasteners for axially securing said clutch release bearing assembly to an associated housing, said clutch release bearing assembly further including alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, said alignment means including support means for supporting said housing member against a radially extending support surface on said associated housing and generally axially retaining said housing member while permitting a preselected limited radial movement.

23. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said ring portion extending outwardly from said cylinder portion whereby said ring portion is substantially radially unsupported, an annular dust cap secured to the outer end of said cylinder portion and having a seal member adapted to engage said piston, said housing member having a pair of radially outwardly extending mounting arms adapted to receive fasteners for axially securing said clutch release bearing assembly to an associated housing, said clutch release bearing assembly further including alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, said housing member having a radially extending annular end surface at one end of said cylinder portion and adapted to engage said support surface, said mounting arms adapted to be spaced from said support surface whereby engagement of said housing member and said support housing is substantially solely between said annular end surface and said support surface, the contact area of said end surface being preselected to minimize friction and facilitate radial movement of said housing member.

24. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said ring portion extending outwardly from said cylinder portion whereby said ring portion is substantially radially unsupported, an annular dust cap secured to the outer end of said cylinder portion and having a seal member adapted to engage said piston, said housing member having a pair of radially outwardly extending mounting arms adapted to receive fasteners for axially securing said clutch release bearing assembly to an associated housing, said clutch release bearing assembly further including alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, and pressure means adapted to maintain a residual fluid pressure in said cylinder cavity, said pressure means including a two way check valve.

25. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston being operatively associated with the clutch release bearing for providing reciprocable movement of the clutch release bearing with said piston, said clutch release bearing assembly further including an annular seal located within said cylinder cavity for providing a seal between that portion of said cylinder cavity in which said piston is located and the remainder of said cylinder cavity, said seal adapted to reciprocate with said piston, and support means connected between said seal and said piston for supporting the inner end of said piston in radially spaced relationship from the confronting walls of said cylinder cavity.

26. The system of claim 25 with said support means resiliently connecting said piston and said seal whereby said piston can move to provide alignment of the axis of rotation of the clutch release bearing with the clutch axis.

27. The system of claim 25 with said support means comprising an annular ring matingly engaged with a complementary annular groove.

28. The system of claim 25 with said piston having a ring portion for supporting the clutch release bearing, said ring portion extending outwardly from said cylinder portion whereby a portion of said piston including said ring portion is radially unsupported, said piston and hence said ring portion and the release bearing being movable pivotally relative to the clutch axis.

29. The system of claim 25 with said cylinder cavity having a circular contour generally defining an annulus, said cylinder portion having a radially outer wall portion and a radially inner wall portion radially spaced therefrom to define said cavity, said cylinder cavity having an opening at one end adapted to receive said tubular piston, a connecting wall portion located at the opposite end of said opening for connecting said radially outer and inner wall portions together, said radially outer and inner wall portions being made of a molded plastic, said piston having a ring portion for supporting the clutch release bearing, said ring portion extending outwardly from said cylinder portion whereby a portion of said piston including said ring portion is radially unsupported, said piston and hence said ring portion and the release bearing being movable pivotally relative to the clutch axis.

30. The system of claim 25 with said cylinder cavity having a circular contour generally defining an annulus, said cylinder portion having a radially outer wall portion and a radially inner wall portion radially spaced therefrom to define said cavity, said cylinder cavity having an opening at one end adapted to receive said tubular piston, a connecting wall portion located at the opposite end of said opening and being integrally formed with said radially outer and inner wall portions for connecting said radially outer and inner wall portions together as a one piece integral structure, said cylinder portion including said radially outer and inner wall portions and said connecting wall portion being made of a one piece molded plastic, whereby the need for a seal between said outer and inner wall portions and said connecting wall portion is obviated, said piston having ring portion for supporting the clutch release bearing, said ring portion extending outwardly from said cylinder portion whereby a portion of said piston including said ring portion is radially unsupported, said piston and hence said ring portion and the release bearing being movable pivotally relative to the clutch axis.

31. The system of claim 25 with said piston having a ring portion for supporting the clutch release bearing, said ring portion extending outwardly from said cylinder portion whereby a portion of said piston including said ring portion is radially unsupported, said piston and hence said ring portion and the release bearing being movable pivotally relative to the clutch axis, said piston being movable radially and pivotally relative to said cylinder cavity for permitting a preselected radial movement in response to engagement of the clutch release bearing with the clutch actuating member whereby the axis of rotation of the clutch release bearing can be substantially moved into alignment with the clutch axis.

32. The system of claim 25 with said cylinder cavity having a circular contour generally defining an annulus, said cylinder portion having a radially outer wall portion and a radially inner wall portion radially spaced therefrom to define said cavity, said cylinder cavity having an opening at one end adapted to receive said tubular piston, a connecting wall portion located at the opposite end of said opening for connecting said radially outer and inner wall portions together, said radially outer and inner wall portions being made of a molded plastic, said piston having a ring portion for supporting the clutch release bearing, said ring portion extending outwardly from said cylinder portion whereby a portion of said piston including said ring portion is radially unsupported, said piston and hence said ring portion and the release bearing being movable radially and pivotally relative to said cylinder cavity for permitting a preselected radial and pivotal movement in response to engagement of the clutch release bearing with the clutch actuating member whereby the axis of rotation of the clutch release bearing can be substantially moved into alignment with the clutch axis.

33. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure in said cylinder cavity, said piston having a support ring portion adapted to supportingly receive the clutch release bearing for reciprocable movement with said piston, said cylinder portion being integral with the remainder of said cylinder housing whereby the need for a seal between said cylinder portion and the connecting portions of said cylinder housing is obviated, said ring portion extending outwardly from said cylinder portion whereby said ring portion is substantially radially unsupported, an annular dust cap secured to the outer end of said cylinder portion and having a seal member adapted to engage said piston, alignment means separate from the clutch release bearing and defining a radial clearance for permitting a preselected radial and pivotal movement of at least a part of said clutch release bearing assembly in response to engagement of the clutch release bearing with the clutch actuating member whereby the axis of rotation of the clutch release bearing can be substantially radially and pivotally moved into alignment with the clutch axis, said clutch release bearing assembly further including means for supporting the inner end of said piston in radially spaced relationship from the confronting walls of said cylinder cavity, said support means connected between said seal and said piston for supporting the inner end of said piston in radially spaced relationship from the confronting walls of said cylinder cavity.

34. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, said cylinder cavity having a circular contour generally defining an annulus, said cylinder portion having a radially outer wall portion and a radially inner wall portion radially spaced therefrom to define said cavity, said cylinder cavity having an opening at one end defined by the ends of said radially inner and outer wall portions, a generally tubular piston received through said opening in said cylinder cavity for reciprocation therein generally along said central axis in response to fluid pressure in said cylinder cavity, said radially outer and inner wall portions being concentric relative to one another throughout the axial extent of said cavity including the opening at said one end and being equally spaced from one another at both axial ends thereof a distance providing a preselected radial clearance with said piston extending at least the length of reciprocation of said piston within said cavity, said piston having a bearing support portion located at its axially outer end for receiving and supporting the clutch release bearing for reciprocable movement with said piston seal means located within said cylinder cavity and adapted for movement with said piston and for providing a seal of that portion of said cavity located axially inwardly of said piston, a connecting wall portion located at the opposite end of said cavity opening and connecting said radially outer and inner wall portions together, said radially inner wall portion having a radially inner sealing surface located within said cavity and adapted to be sealingly engaged by said seal means, said radially outer wall portion having a radially outer sealing surface located within said cavity and being generally in radial confrontation and axially co-extensive with said inner sealing surface and adapted to be sealingly engaged by said seal means, said cavity having a preselected axial length relative to the length of said piston such that said bearing support portion is radially unsupported for its length of travel, said cylinder portion including said radially outer and inner wall portions, and said connecting wall portion being made of an integral, one piece molded plastic construction whereby the need for a sealed connection between said outer and inner wall portions and said connecting wall portion is obviated and the concentricity of said radially inner and outer wall portions is assured, and said one piece molded plastic construction providing said radially inner and outer sealing surface with good lubricity and a scoreless finish.

35. The system of claim 34 in which said radially outer and inner wall portions extend generally coextensively axially outwardly and are axially spaced from said bearing support portion.

36. The system of claim 34 in which said one piece molded plastic construction is of a thermoplastic, glass reinforced material.

37. The system of claim 36 in which said thermoplastic, glass-reinforced material is essentially a nylon resin and includes no less than 13% by weight chopped fiberglass.

38. The system of claim 34 including pressure means adapted to maintain a residual fluid pressure in said cylinder cavity.

39. The system of claim 38 in which with said pressure means comprises resilient means connected to said piston for urging it into said cylinder cavity.

40. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, said cylinder cavity having a circular contour generally defining an annulus, said cylinder portion having a radially outer wall portion and a radially inner wall portion radially spaced therefrom to define said cavity, said cylinder cavity having an opening at one end, a generally tubular piston adapted to be received through said opening in said cylinder cavity for reciprocation therein generally along said central axis in response to fluid pressure in said cylinder cavity, said piston having a bearing support portion located at its axially outer end for receiving and supporting the clutch release bearing, seal means located within said cylinder cavity and adapted for movement with said piston and for providing a seal of that portion of said cavity located axially inwardly of said piston, a connecting wall portion located at the opposite end of said cavity opening and connecting said radially outer and inner wall portions together, said radially inner wall portion having a radially inner sealing surface located within said cavity and adapted to be sealingly engaged by said seal means, said radially outer wall portion having a radially outer sealing surface located within said cavity and being generally in radial confrontation and axially co-extensive with said inner sealing surface and adapted to be sealingly engaged by said seal means, said cavity having a preselected axial length relative to the length of said piston such that said bearing support portion is radially unsupported for its length of travel, said piston being in radial clearance with said inner and outer wall portion with said total radial clearance being at least around 0.01 inches for a mean diameter of said cavity of around 1.8 inches, said seal means comprising a seal member secured to the axially inner end of said piston and supporting said axially inner end spaced from said inner and outer wall portions, said cylinder portion including said radially outer and inner wall portions and said connecting wall portion being made of a one piece molded plastic having good lubricity whereby the need for a sealed connection between said outer and inner wall portions and said connecting wall portion is obviated.

41. In a system for actuating a clutch by axial movement of an actuating member rotatable about a clutch axis via engagement with a clutch release bearing, the improvement comprising a fluid actuated clutch release bearing assembly having a central axis and being adapted to be supported with central axis generally in line with the clutch axis, said clutch release bearing assembly including a housing member having an annular, axially extending cylinder portion having a cylinder cavity, said cylinder cavity having a circular contour generally defining an annulus, said cylinder portion having a radially outer wall portion and a radially inner wall portion radially spaced therefrom to define said cavity, said cylinder cavity having an opening at one end, a generally tubular piston adapted to be received through said opening in said cylinder cavity for reciprocation therein generally along said central axis in response to fluid pressure in said cylinder cavity, seal means located within said cylinder cavity and adapted for movement with said piston and for providing a seal of that portion of said cavity located axially inwardly of said piston, a connecting wall portion located at the opposite end of said cavity opening and connecting said radially outer and inner wall portion together, said piston adapted to engage the clutch release bearing for providing reciprocable movement with the said piston, said radially inner wall portion having a radially inner sealing surface located within said cavity and adapted to be sealingly engaged by said seal means, said radially outer wall portion having a radially outer sealing surface located within said cavity and being generally in radial confrontation and axially co-extensive with said inner sealing surface and adapted to be sealingly engaged by said seal means, said piston being in radial clearance with said inner and outer wall portions with said total radial clearance being at least about 0.1 inches said cylinder portion including said radially outer and inner wall portions and said connecting wall portion being made of a one piece molded plastic having good lubricity whereby the need for a sealed connection between said outer and inner wall portions and said connecting wall portion is obviated.

* * * * *